United States Patent [19]

Smith et al.

[11] Patent Number: 5,244,928

[45] Date of Patent: Sep. 14, 1993

[54] FOAMABLE COMPOSITION AND PROCESS FOR MAKING LARGE CELL SIZE ALKENYL AROMATIC POLYMER FOAM STRUCTURE WITH 1,1-DIFLUOROETHANE

[75] Inventors: Roy E. Smith, Pickerington; Warren H. Griffin, Granville; Deborah L. Kocsis, Newark; Dennis R. Lantz, Granville, all of Ohio

[73] Assignee: The Dow Chemical Company, Midland, Mich.

[21] Appl. No.: 927,110

[22] Filed: Aug. 7, 1992

[51] Int. Cl.$^5$ ............................................. C08J 9/14
[52] U.S. Cl. ..................................... 521/79; 521/87; 521/88; 521/97; 521/98; 521/146; 521/910
[58] Field of Search ................. 521/79, 87, 88, 97, 521/98, 146

[56] References Cited

U.S. PATENT DOCUMENTS

| | | | |
|---|---|---|---|
| Re. 31,744 | 11/1984 | Watanabe et al. | 521/79 |
| 3,725,317 | 4/1973 | Roden et al. | 521/79 |
| 4,085,073 | 4/1978 | Suh et al. | 521/79 |
| 4,328,319 | 5/1982 | Osipow et al. | 521/79 |
| 4,422,877 | 12/1983 | Spitzer et al. | 521/79 |
| 4,636,527 | 1/1987 | Suh | 521/79 |
| 4,663,361 | 5/1987 | Park | 521/79 |
| 4,694,027 | 9/1987 | Park | 521/79 |
| 4,916,166 | 4/1990 | Suh et al. | 521/79 |
| 4,956,395 | 9/1990 | Leduc | 521/79 |
| 4,997,706 | 3/1991 | Smitz et al. | 521/79 |
| 5,011,866 | 4/1991 | Suh | 521/79 |
| 5,106,882 | 4/1992 | Suh et al. | 521/79 |
| 5,147,896 | 9/1992 | York | 521/79 |

Primary Examiner—Morton Foelak
Attorney, Agent, or Firm—J. Robert Dean, Jr.

[57] ABSTRACT

Disclosed is a process for making extruded, closed-cell alkenyl aromatic polymer foam structure having an average cell size of from about 0.3 to about 3.0 millimeters. The process comprises: a) heating an alkenyl aromatic polymer material having greater than 50 percent by weight alkenyl aromatic monomeric units to form a melt polymer material: b) incorporating into the melt polymer material at an elevated pressure a blowing agent comprising at least 50 percent by weight 1,1-difluoroethane (HFC-152a) based upon the total weight of the blowing agent to form a foamable gel: c) cooling the foamable gel to an optimum foaming temperature prior to extrusion through a die: and d) extruding the foamable gel through a die to form the foam structure. Further disclosed is a foamable gel capable of forming an alkenyl aromatic polymer foam structure having an average cell size of from about 0.3 to about 3.0 millimeters.

9 Claims, No Drawings

FOAMABLE COMPOSITION AND PROCESS FOR MAKING LARGE CELL SIZE ALKENYL AROMATIC POLYMER FOAM STRUCTURE WITH 1,1-DIFLUOROETHANE

BACKGROUND OF THE INVENTION

This invention relates to a process for making a large cell size alkenyl aromatic polymer foam structure with 1,1-difluoroethane. The invention further relates to a foamable gel capable of being expanded to form such a foam structure.

Alkenyl aromatic polymer foam structures have been used extensively commercially in floral and craft applications. The most desirable of such foam structures are typically closed-cell, and further are of relatively large cell size, i.e. 0.3 to 3.0 millimeters.

Due to environmental concerns, it would be desirable to blow large cell size alkenyl aromatic polymer foam structures with a blowing agent having a low ozone depletion potential. One such blowing agent is 1,1-difluoroethane (HFC-152a). HFC-152a is relatively economical, and is readily-available commercially.

In making an alkenyl aromatic polymer foam structure of relatively large cell size, one skilled in the art might select an environmentally-acceptable blowing agent having relatively high solubility in the alkenyl aromatic polymer. High solubility would be sought after because, as a general principle, blowing agents with relatively high solubility in a particular polymer usually produce foam structures with relatively large cell sizes. Blowing agents of relatively low solubility usually produce foam structures having relatively small cell size. Thus, it would not be expected that a blowing agent of relatively low solubility, such as HFC-152a, in an alkenyl aromatic polymer would produce a foam structure of relatively large cell size.

Surprisingly, it has been found that a large cell alkenyl aromatic polymer foam structure can be blown using HFC-152a as a primary blowing agent. Further, the foam structure blown with HFC-152a has high heat distortion temperature properties and low impact strength characteristics.

SUMMARY OF THE INVENTION

According to the present invention, there is a process for making extruded, closed-cell alkenyl aromatic polymer foam structure having an average cell size of from about 0.3 to about 3.0 millimeters. The process comprises: a) heating an alkenyl aromatic polymer material having greater than 50 percent by weight alkenyl aromatic monomeric units to form a melt polymer material; b) incorporating into the melt polymer material at an elevated pressure a blowing agent comprising at least 50 percent by weight 1,1-difluoroethane (HFC-152a) based upon the total weight of the blowing agent and a second blowing agent of lower vapor pressure and higher solubility in the melt polymer material than 1,1-difluoroethane to form a foamable gel; c) cooling the foamable gel to an optimum foaming temperature prior to extrusion through a die: and d) extruding the foamable gel through a die to form the foam structure. The second blowing agent is preferably selected from ethyl chloride, ethanol, acetone, methanol, propanol, dimethyl ether, and ethyl acetate. Ethyl chloride is most preferred.

Further according to the present invention, there is a foamable gel capable of being expanded to form an alkenyl aromatic polymer structure having an average cell size of from about 0.3 to about 3.0 millimeters. The gel has the blowing agents in the proportions described above.

DETAILED DESCRIPTION

The foam structure is comprised of an alkenyl aromatic polymer material. Suitable alkenyl aromatic polymer materials include alkenyl aromatic homopolymers and copolymers of alkenyl aromatic compounds and copolymerizable ethylenically unsaturated comonomers. The alkenyl aromatic polymer material may further include minor proportions of non-alkenyl aromatic polymers. The alkenyl aromatic polymer material may be comprised solely of one or more alkenyl aromatic homopolymers, one or more alkenyl aromatic copolymers, a blend of one or more of each of alkenyl aromatic homopolymers and copolymers, or blends of any of the foregoing with a non-alkenyl aromatic polymer. Regardless of composition, the alkenyl aromatic polymer material comprises at greater than 50 and preferably at greater than 90 weight percent of alkenyl aromatic monomeric units. Most preferably, the alkenyl aromatic polymer material is comprised entirely of alkenyl aromatic monomeric units.

Suitable alkenyl aromatic polymers include those derived from alkenyl aromatic compounds such as styrene, alphamethylstyrene, ethylstyrene, vinyl benzene, vinyl toluene, chlorostyrene, and bromostyrene. A preferred alkenyl aromatic polymer is polystyrene. Minor amounts of monoethylenically unsaturated compounds such as $C_{1-4}$ alkyl acids and esters, ionomeric derivatives, and $C_{2-6}$ dienes may be copolymerized with alkenyl aromatic compounds. Examples of copolymerizable compounds include acrylic acid, methacrylic acid, ethacrylic acid, maleic acid, itaconic acid, acrylonitrile, maleic anhydride, methyl acrylate, ethyl acrylate, methyl methacrylate, vinyl acetate and butadiene. Preferred structures comprise substantially (i.e. greater than 95%) and most preferably entirely of polystyrene because polystyrene foam is economical, and is commonly employed as an insulating plastic foam.

According to the present invention, the alkenyl aromatic polymer foam is generally prepared by heating an alkenyl aromatic polymer material to form a plasticized or melt polymer material, incorporating therein a blowing agent to form a foamable gel, and extruding the gel through a die to form the foam product. Prior to mixing with the blowing agent, the polymer material is heated to a temperature at or above its glass transition temperature or melting point. The blowing agent may be incorporated or mixed into the melt polymer material by any means known in the art such as with an extruder, mixer, blender, or the like. The blowing agent is mixed with the melt polymer material at an elevated pressure sufficient to prevent substantial expansion of the melt polymer material and to generally disperse the blowing agent homogeneously therein. Optionally, a nucleator may be blended in the polymer melt or dry blended with the polymer material prior to plasticizing or melting. The foamable gel is typically cooled to a lower temperature to optimize physical characteristics of the foam structure. The gel is then extruded through a die of desired shape to a zone of lower pressure to form the foam structure.

The primary component of the blowing agent to make the present structure is 1,1-difluoroethane (HFC- 152a). It comprises greater than 50 percent to about 90 weight percent of the blowing agent based upon the total weight of the blowing agent.

The blowing agent further comprises a secondary blowing agent present from between about 10 to less than 50 weight percent and preferably from about 20 to about 40 weight percent based upon the total weight of the blowing agent. The secondary blowing agent will have a lower vapor pressure in air at 25° C. than HFC-152a. The secondary blowing agent will further be more soluble in the alkenyl aromatic polymer than HFC-152a. The secondary blowing agent will preferably have a vapor pressure in air at 25° C. of less than 580 kilopascals, and preferably have a solubility in polystyrene (200,000 weight average molecular weight according to size exclusion chromatography) of greater than 1.9 parts per hundred by weight at 25° C. per atmosphere of air pressure based upon the weight of the polymer. Preferred secondary blowing agents are ethyl chloride, ethanol, acetone, methanol, propanol, dimethyl ether, and ethyl acetate. Ethyl chloride is most preferred.

The blowing agent may further comprise small amounts (less than 15 weight percent) of a tertiary blowing agent comprising other known blowing agents including inorganic agents, organic blowing agents other than those mentioned above, and chemical blowing agents. Suitable inorganic blowing agents include carbon dioxide, nitrogen, argon, water, air, and helium. Organic blowing agents include aliphatic hydrocarbons having 1–9 carbon atoms and fully and partially halogenated aliphatic hydrocarbons having 1–4 carbon atoms. Aliphatic hydrocarbons include methane, ethane, propane, n-butane, isobutane, n-pentane, isopentane, neopentane, and the like. Fully and partially halogenated aliphatic hydrocarbons include fluorocarbons, chlorocarbons, and chlorofluorocarbons. Examples of fluorocarbons include methyl fluoride, perfluoromethane, difluoromethane (HFC-32), ethyl fluoride, 1,1,1-trifluoroethane (HFC-143a), 1,1,1,2-tetrafluoro-ethane (HFC-134a), pentafluoroethane, perfluoroethane, 2,2-difluoropropane, 1,1,1-trifluoropropane, perfluoropropane, perfluorobutane, perfluorocyclobutane. Partially halogenated chlorocarbons and chlorofluorocarbons for use in this invention include methyl chloride, methylene chloride, 1,1,1-trichloroethane, 1,1-dichloro-1-fluoroethane (HCFC-141b), 1-chloro-1,1-difluoroethane (HCFC-142b), 1,1-dichloro-2,2,2-trifluoroethane (HCFC-123) and 1-chloro-1,2,2,2-tetrafluoroethane (HCFC-124). Fully halogenated chlorofluorocarbons include trichloromonofluoromethane (CFC-11), dichlorodifluoromethane (CFC-12), trichlorotrifluoroethane (CFC-113), dichlorotetrafluoroethane (CFC-114), chloroheptafluoropropane, and dichlorohexafluoropropane. Chemical blowing agents include azodicarbonamide, azodiisobutyro-nitrile, benzenesulfonhydrazide, 4,4-oxybenzene sulfonyl-semicarbazide, p-toluene sulfonyl semi-carbazide, barium azodicarboxylate, N,N'-dimethyl-N,N'-dinitrosoterephthalamide, and trihydrazino triazine.

The amount of blowing agent incorporated into the polymer melt material to make a foam-forming polymer gel is from about 0.2 to about 5.0, preferably from about 0.5 to about 3.0, and most preferably from about 1.0 to 2.50 moles per kilogram of polymer.

A surprising feature of this invention is that it is possible to blow a closed-cell, alkenyl aromatic polymer foam structure using HFC-152a as the primary blowing agent. The use is surprising in view of its relatively low solubility in alkenyl aromatic polymers, such as polystyrene, and its relatively high vapor pressure. Typically, the ability of a blowing agent to produce a foam structure with relatively large cells has been observed to decrease as its solubility in the polymer decreases and as its vapor pressure increases. Thus, a blowing agent with relatively low solubility and a relatively high vapor pressure will usually produce a relatively small cell size foam structure. A blowing agent with relatively high solubility and relatively low vapor pressure will usually produce a relatively large cell size foam structure. The process of the present invention is surprising because it does not follow pre ious observations.

Table 1 illustrates solubility and vapor pressure data for several common blowing agents.

TABLE 1

| | Ethyl Chloride | Ethanol | HCFC-142b | CFC-12 | HCFC-22 | HFC-152a | HFC-134a |
|---|---|---|---|---|---|---|---|
| SOLUBILITY AND VAPOR PRESSURE DATA FOR COMMON BLOWING AGENTS | | | | | | | |
| Solubility* | 18.0 | 22.2 | 6.3 | 1.5 | 1.6 | 1.8 | 1.0 |
| Vapor Pressure (25° C.) kPa | 163.4[a] | 394.0[a] | 337.9[b] | 651.3[a] | 1044[b] | 598.5[b] | 665.4[b] |

*pph/atm in polystyrene
[a]Chemical Engineers Handbook, 5th ed.
[b]DuPont Brochure AG-1, "Alternatives to chlorofluorocarbons"
HCFC-142b is 1-chloro-1,1-difluoroethane
CFC-12 is dichlorodifluoromethane
HCFC-22 is chlorodifluoromethane
HFC-152a is 1,1-difluoroethane
HFC-134a is 1,1,1,2-tetrafluoroethane Relatively large cell size alkenyl aromatic polymer foams have been made using HCFC-142b with or without ethyl chloride. HCFC-142b has been used successfully in making large cell size foams because of its relatively moderate solubility in alkenyl aromatic polymers and its relatively moderate vapor pressure.

Other above-mentioned blowing agents, namely CFC-12, HCFC-22, HFC-134a, typically have not been successfully employed in making relatively large cell foams due to their relatively low solubility in alkenyl aromatic polymers and high vapor pressure. Given that HFC-152a has similar vapor pressure and solubility in alkenyl aromatic polymers as those blowing agents, it is surprising that a relatively large cell size foam could be produced with it.

Ethyl chloride and ethanol have not been used successfully as primary blowing agents because of foam structure collapse problems, but have been used successfully as secondary blowing agents.

The foam component of the foam structure has the density of from about 10 to about 150 and most preferably from about 10 to about 70 kilograms per cubic meter (kg/m3). The foam has an average cell size of from about 0.3 to about 3.0 and preferably from about 0.4 to about 2.0 millimeters (mm) according to ASTM D3576.

The foam component of the present foam structure is closed-cell. Preferably, the present foam is greater than 90 percent closed-cell according to ASTM D2856-A.

Various additives may be incorporated in the present foam structure such as inorganic fillers, pigments, antioxidants, acid scavengers, ultraviolet absorbers, flame retardants, processing aids, extrusion aids, and the like.

The foam structure is most desirably used as a substrate in floral and craft, buoyancy and flotation billet, and sign display board applications. The foam structure is readily machinable or fabricable to form a variety of shapes.

The foam structure may be used to insulate a surface by applying to the surface an insulating panel fashioned from the present structure. Such panels are useful in any conventional insulating applications such as roofing, buildings, refrigerators, etc.

The foam structure may be formed into a plurality of discrete foamed particles for conventional loose-fill cushioning and packaging applications, or may be ground into scrap for use as blown insulation.

Though the preferred process for making the present structure is an extrusion process, it is understood that the above structure may be formed by expansion of beads, which may be molded at the time of expansion to form structures of various shapes. Insulating panels formed from molded, expandable beads are commonly referred to as bead board.

The following are examples of the present invention, and are not to be construed as limiting. Unless otherwise indicated, all percentages, parts, or proportions are by weight.

EXAMPLE(S)

Foam structures were prepared according to the process of the present invention using HFC-152a as the primary blowing agent and ethyl chloride or ethanol as the secondary blowing agent. The foam structures produced had the desired large average cell sizes.

In each example, an 2½"(64 mm) extruder operated at 90 kg/hr polystyrene. The alkenyl aromatic polymer employed was polystyrene with a 200,000 weight average molecular weight as measured by size exclusion chromatography. All additives were dry blended with the polystyrene, and fed to the extruder. Blowing agents were incorporated into the polymer melt by means of a separate mixer. Cell size was measured according to ASTM D3576. All weight proportions, indicated as parts per hundred (pph), were based upon the weight of the polystyrene.

EXAMPLE 1

Additives were: hexabromocyclododecane (HBCD) at 1.0 pph, barium stearate at 0.05 pph, tetrasodium pyrophosphate at 0.02 pph, and linear low density polyethylene (LLDPE) at 0.30 pph. The blowing agent was a mixture of 6.6 pph HFC-152a and 4.0 pph ethyl chloride. The die gap was 2.9 mm and the die pressure was 4240 kilopascals (kPa).

The foam structure produced had a cell size of 1 3 mm, a desirable large average cell size. The structure further had a density of 27.9 kg/m3, and a compressive strength balance (CSB) of 1.3. CSB is a ratio of the highest compressive strength measurement to the lowest compressive strength measurement among the three dimensions of the structure. A CSB of 1.2-1.4 or lower is desirable for foam structures used in floral and craft applications.

EXAMPLE 2

Additives were: HBCD at 0.85 pph, LLDPE at 0.30 pph, magnesium oxide at 0.04 pph, calcium stearate at 0.08 pph, and talc at 0.025 pph. The blowing agent was a mixture of 5.0 pph HFC-152a, 2.25 pph ethyl chloride, and 1.2 pph carbon dioxide. The die gap was 2.0 mm, the die pressure was 5200 kPa and the foaming temperature was 125.6° C.

The foam structure produced had a cell size of 0.44 mm, a desirable large average cell size. The structure further had a density of 30.3 kg/m3, and a heat distortion temperature (HDT) of 185° C. The HDT is the temperature at or above which the foam structure will distort. Preferably, the HDT is as high as possible. This foam structure is particularly desirable for signboard and other graphic art applications because of its high heat distortion.

EXAMPLE 3

Additives were: HBCD at 0.75 pph, barium stearate at 0.05 pph, tetrasodium pyrophosphate at 0.05 pph, and LLDPE at 0.30 pph. The blowing agent was a mixture of 6.6 pph HFC-152a and 2.85 pph ethyl alcohol. The die gap was 2.9 mm and the die pressure was 4082 kPa.

The foam structure produced had a cell size of 1.0 mm, a desirable large average cell size. The structure further had a density of 30.1 kg/m3, a compressive balance of 1.2, and a HDT of 185° C.

While embodiments of the process and the foamable composition of the present invention have been shown with regard to specific details, it will be appreciated that depending upon the manufacturing process and the manufacturer's desires, the present invention may be modified by various changes while still being fairly within the scope of the novel teachings and principles herein set forth.

What is claimed is:

1. The process for making an extruded, closed-cell alkenyl aromatic polymer foam structure having an average cell size of from about 0.3 to about 3.0 millimeters, comprising:

a) heating an alkenyl aromatic polymer material comprising greater than 50 percent by weight alkenyl aromatic monomeric units to form a melt polymer material;

b) incorporating into the melt polymer material at an elevated pressure a blowing agent comprising as a primary blowing agent greater than 50 percent by weight 1,1-difluoroethane and from about 10 to less than 50 percent by weight of a secondary blowing agent based upon the total weight of the blowing agent to form a foamable gel, the secondary blowing agent being selected from the group consisting of ethyl chloride, ethanol, acetone, methanol, propanol, dimethyl ether, and ethyl acetate;

c) cooling the foamable gel to an optimum foaming temperature prior to extrusion through a die; and d) extruding the foamable gel through the die into a region of lower pressure to form the foam structure.

2. The process of claim 1, wherein the secondary blowing agent is ethyl chloride.

3. The process of claim 1, wherein a nucleating agent is incorporated into the melt polymer material.

4. The process of claim 1, wherein the blowing agent is incorporated into the melt polymer material at a concentration of form about 0.2 to about 5.0 moles per kilogram of melt polymer material.

5. The process of claim 1, wherein the melt polymer material comprises greater than 90 percent by weight alkenyl aromatic monomeric units.

6. The process of claim 1, wherein the alkenyl aromatic polymer is polystyrene.

7. The process of claim 1, wherein the secondary blowing agent ha s a vapor pressure in air at 25° C. of less than 580 kilopascals and a solubility in polystyrene of 200,000 weight average molecular weight of greater than 1.9 parts per hundred at 25° C. per atmosphere pressure based upon the weight of the polymer.

8. The process of claim 1, wherein the blowing agent further comprises less than 15 weight percent based upon the total weight of the blowing agent of a tertiary blowing agent different than the primary or secondary blowing agent.

9. The process of claim 8, wherein the tertiary blowing agent is one or more inorganic blowing agents.

* * * * *